US011305602B2

United States Patent
Du et al.

(10) Patent No.: US 11,305,602 B2
(45) Date of Patent: Apr. 19, 2022

(54) VEHICLE DETECTION AND ISOLATION SYSTEM FOR DETECTING SPRING AND STABILIZING BAR ASSOCIATED DEGRADATION AND FAILURES

(71) Applicant: GM GLOBAL TECHNOLOGY OPERATIONS LLC, Detroit, MI (US)

(72) Inventors: Xinyu Du, Oakland Township, MI (US); Lichao Mai, Sterling Heights, MI (US); Brian K. Saylor, South Lyon, MI (US); Arvind Sharma, Clarkston, MI (US); Kevin A. Cansiani, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 164 days.

(21) Appl. No.: 16/673,343

(22) Filed: Nov. 4, 2019

(65) Prior Publication Data

US 2021/0129615 A1    May 6, 2021

(51) Int. Cl.
*B60G 17/0185* (2006.01)
*B60G 17/017* (2006.01)

(52) U.S. Cl.
CPC ....... *B60G 17/0185* (2013.01); *B60G 17/017* (2013.01); *B60G 2400/0521* (2013.01);
(Continued)

(58) Field of Classification Search
CPC ................ B60G 17/015; B60G 17/017; B60G 17/0185; B60G 17/01908;
(Continued)

(56) References Cited

U.S. PATENT DOCUMENTS 6,332,103 B1 * 12/2001 Steenson, Jr. ............ A61G 5/04
701/1
6,766,230 B1 * 7/2004 Rizzoni .............. B60G 17/0185
701/32.9

(Continued)

FOREIGN PATENT DOCUMENTS

DE    102016207789 A1 * 11/2016    ......... B60G 17/0185
DE    102018122058 A1 *  3/2019    ............ B60G 21/005
DE    112017005021 T5 *  8/2019    ......... B60G 17/0165

OTHER PUBLICATIONS

Office Action dated Oct. 13, 2021 from German Patent Office for German Patent Application No. 102020126736.3; 5 Pages. (Year: 2021) Retrieved Online From the German Patent Office Jan. 13, 2022.*

(Continued)

*Primary Examiner* — Hunter B Lonsberry
*Assistant Examiner* — Daniel L Greene (57) ABSTRACT

A system for testing a suspension system of a vehicle includes an inertial measurement module and a suspension fault detection module. The inertial measurement module is configured to, while the vehicle is not moving, collect sensor data from one or more inertial measurement sensors for different states of the suspension system. The sensor data is indicative of inertial states of the vehicle while the suspension system is in each of the different states. The suspension fault detection module is configured to, based on the sensor data and a set of thresholds, determine whether a fault exists with the suspension system, isolate and identify the fault, and perform a countermeasure based on the detection of the fault.

20 Claims, 8 Drawing Sheets

(52) U.S. Cl.
CPC ............... *B60G 2400/0522* (2013.01); *B60G 2400/104* (2013.01); *B60G 2400/106* (2013.01); *B60G 2800/20* (2013.01)

(58) Field of Classification Search
CPC .... B60G 2400/0511; B60G 2400/0512; B60G 2400/0521; B60G 2400/0522; B60G 2400/104; B60G 2400/106; B60G 2600/02; B60G 2600/08; B60G 2800/20; B60G 2800/984
See application file for complete search history.

(56) References Cited

U.S. PATENT DOCUMENTS

| | | | |
|---|---|---|---|
| 8,054,084 B2 | 11/2011 | Schulz et al. | |
| 8,082,776 B2 | 12/2011 | Halalay et al. | |
| 8,380,388 B2 | 2/2013 | Shin et al. | |
| 8,464,102 B2 | 6/2013 | Sinha et al. | |
| 8,471,589 B2 | 6/2013 | Zhang et al. | |
| 8,577,663 B2 | 11/2013 | Lu et al. | |
| 8,903,668 B2 | 12/2014 | Zhang et al. | |
| 9,018,881 B2 | 4/2015 | Mao et al. | |
| 9,097,767 B2 | 8/2015 | Howell et al. | |
| 9,231,515 B2 | 1/2016 | Mao et al. | |
| 10,215,148 B2 | 2/2019 | Jiang et al. | |
| 10,337,438 B2 | 7/2019 | Jiang et al. | |
| 2004/0059480 A1* | 3/2004 | Hrovat | B60R 21/0132 701/29.2 |
| 2005/0080543 A1* | 4/2005 | Lu | B60G 17/019 701/70 |
| 2007/0078576 A1 | 4/2007 | Salman et al. | |
| 2008/0059021 A1* | 3/2008 | Lu | B60G 17/0195 701/36 |
| 2012/0200298 A1 | 8/2012 | Zhang et al. | |
| 2013/0328277 A1* | 12/2013 | Ryan | B60G 17/016 280/5.519 |
| 2014/0239602 A1* | 8/2014 | Blankenship | B60G 17/0152 280/5.515 |
| 2014/0297117 A1* | 10/2014 | Near | B60G 17/015 701/37 |
| 2016/0121924 A1* | 5/2016 | Norstad | B60T 8/00 701/42 |
| 2017/0137023 A1* | 5/2017 | Anderson | B60W 50/14 |
| 2017/0297402 A1* | 10/2017 | Chen | H04W 4/70 |
| 2019/0102959 A1* | 4/2019 | Saylor | G07C 5/0825 |
| 2020/0398629 A1* | 12/2020 | Zhao | B60G 17/0152 |

OTHER PUBLICATIONS

Office Action dated Oct. 13, 2021 from German Patent Office for German Patent Application No. 102020126736.3; 5 Pages.

* cited by examiner

VEHICLE DETECTION AND ISOLATION SYSTEM FOR DETECTING SPRING AND STABILIZING BAR ASSOCIATED DEGRADATION AND FAILURES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to in-vehicle fault detection and diagnostic systems.

A self-propelled land based vehicles, such as cars, buses, motorcycles, off-road vehicles, trucks, etc. typically include two or more wheels and corresponding suspension components. As an example, an automobile typically includes an engine and/or one or more electric motors to self-propel the automobile and four wheels with corresponding suspension components.

A suspension of a vehicle may include springs, shocks, struts, stabilizing bars, links, arms, bushings, and/or other suspension components. Over time and use, the suspensions components may rust, corrode and/or be overloaded. This can result in component degradation, faults and/or failures, such as cracking and/or breaking of parts (e.g., springs, brackets, etc.), wearing out and/or loosening of components, degrading of bushings, and/or other component degradation and/or failures. The wearing out and/or loosening of components results in increased movement between components sometimes referred to as increased "play". The stated degradation, faults and failures can degrade driving performance, cause other vehicle components to degrade at accelerated rates, such as tires, and/or can cause a vehicle accident.

SUMMARY

A system for testing a suspension system of a vehicle is provided. The system includes an inertial measurement module and a suspension fault detection module. The inertial measurement module is configured to, while the vehicle is not moving, collect sensor data from one or more inertial measurement sensors for different states of the suspension system. The sensor data is indicative of inertial states of the vehicle while the suspension system is in each of the different states. The suspension fault detection module is configured to, based on the sensor data and a set of thresholds, determine whether a fault exists with the suspension system, isolate and identify the fault, and perform a countermeasure based on the detection of the fault.

In other features, the system further includes the one or more inertial measurement sensors configured to generate one or more sensor signals, wherein the one or more sensor signals include the sensor data.

In other features, the sensor data includes longitudinal acceleration data and lateral acceleration data.

In other features, the sensor data includes pitch rate data and roll rate data.

In other features, the suspension fault detection module is configured to: integrate the sensor data to determine a pitch angle and a roll angle of the vehicle; and based on the pitch angle and the roll angle, determine whether there is a fault with the suspension system.

In other features, the sensor data includes longitudinal acceleration data and lateral acceleration data. The suspension fault detection module is configured to: determine averages of the longitudinal acceleration data and the lateral acceleration data over a predetermined period of time; compare the averages to the set of thresholds; and based on results of comparing the averages to the set of thresholds, determine whether there is a fault with the suspension system and isolate and identify the fault.

In other features, the sensor data includes pitch rate data and roll rate data. The suspension fault detection module is configured to: determine averages of the pitch rate data and the roll rate data over a predetermined period of time; compare the averages to the set of thresholds; and based on results of comparing the averages to the set of thresholds, determine whether there is a fault with the suspension system and isolate and identify the fault.

In other features, the sensor data includes at least one of longitudinal and lateral acceleration data or pitch and roll rate data. The suspension fault detection module is configured to: determine pitch angles and roll angles based on the at least one of the longitudinal and lateral acceleration data or the pitch and roll rate data; determine averages of pitch angles and average roll angles over a predetermined period of time; compare the average pitch angles and the average roll angles to the set of thresholds; and based on results of comparing the average pitch angles and the average roll angles to the set of thresholds, determine whether there is a fault with the suspension system and isolate and identify the fault.

In other features, the suspension fault detection module is configured to, based on the sensor data and the set of thresholds, determine whether a fault exists with a particular spring of the suspension system.

In other features, the suspension fault detection module is configured to, based on the sensor data and the set of thresholds, determine whether a fault exists with a stabilizing bar of the suspension system.

In other features, the suspension fault detection module is configured to: check pressures of tires of the vehicle; and based on the pressures, enable testing of the suspension system of the vehicle to determine whether a fault exists with the suspension system.

In other features, the suspension fault detection module is configured to: compare a weight of the vehicle to a baseline weight; and based on a difference between the weight of the vehicle and the baseline weight, compensate for the difference when determining whether a fault exists with the suspension system.

In other features, a method for testing a suspension system of a vehicle. The method includes: while the vehicle is not moving, collecting sensor data from one or more inertial measurement sensors for different states of the suspension system, where the sensor data is indicative of inertial states of the vehicle while the suspension system is in each of the different states; based on the sensor data and a set of thresholds, determining whether a fault exists with the suspension system, isolate and identify the fault; and performing a countermeasure based on the detection of the fault.

In other features, the sensor data includes longitudinal acceleration data and lateral acceleration data.

In other features, the sensor data includes pitch rate data and roll rate data.

In other features, the method further includes: integrating the sensor data to determine a pitch angle and a roll angle of the vehicle; and based on the pitch angle and the roll angle, determining whether there is a fault with the suspension system.

In other features, the method further includes: determining averages of longitudinal acceleration data and lateral acceleration data over a predetermined period of time, wherein the sensor data includes the longitudinal acceleration data and the lateral acceleration data; comparing the averages to the set of thresholds; and based on results of comparing the averages to the set of thresholds, determining whether there is a fault with the suspension system and isolate and identify the fault.

In other features, the method further includes: determining averages of pitch rate data and roll rate data over a predetermined period of time, wherein the sensor data includes the pitch rate data and the roll rate data; comparing the averages to the set of thresholds; and based on results of comparing the averages to the set of thresholds, determining whether there is a fault with the suspension system and isolate and identify the fault.

In other features, the method further includes: determining pitch angles and roll angles based on at least one of longitudinal and lateral acceleration data or pitch and roll rate data, wherein the sensor data includes the at least one of the longitudinal and lateral acceleration data or the pitch and roll rate data; determining averages of pitch angles and average roll angles over a predetermined period of time; comparing the average pitch angles and the average roll angles to the set of thresholds; and based on results of comparing the average pitch angles and the average roll angles to the set of thresholds, determining whether there is a fault with the suspension system and isolate and identify the fault.

In other features, the method further includes: checking pressures of tires of the vehicle; based on the pressures, enable testing of the suspension system of the vehicle to determine whether a fault exists with the suspension system; comparing a weight of the vehicle to a baseline weight; and based on a difference between the weight of the vehicle and the baseline weight, compensating for the difference when determining whether a fault exists with the suspension system.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A driver of a vehicle may be able to detect difference in vehicle performance when a spring or a stabilizing bar of the vehicle breaks. For example, if a spring of the vehicle breaks, height of the vehicle in an area of the broken spring may decrease and clunking noises may be heard, especially when driving over bumps. There is also less absorption of shock forces exerted on the suspension system due to the broke spring and the vehicle may tend to pull in a lateral direction instead of heading in a straight forward direction. When the stabilizing bar breaks, the vehicle may experience more "sway" or "roll", for example, during turns.

The examples set forth herein include suspension testing systems and methods for determining whether there is one or more faults with one or more springs and/or one or more stabilizing bars of a vehicle. A suspension fault detection module is disclosed that performs static tests and during the tests monitors pitch and roll accelerations, pitch and roll rates, and/or pitch and roll angles of a vehicle and quickly, efficiently and accurately detects, isolates and identifies spring and stabilizer bar faults. The faults include degradation changes and failures of the springs and stabilizing bars and/or associated components. The faults also include when a component is disconnected. Degradation changes of a component may refer to when there is cracking, thinning, corroding, rusting, wearing out, and/or other degrading characteristic changes of a component have occurred and performance of the component has degraded. A failure of a component may refer to when a component breaks and is no longer usable.

Figure 1:
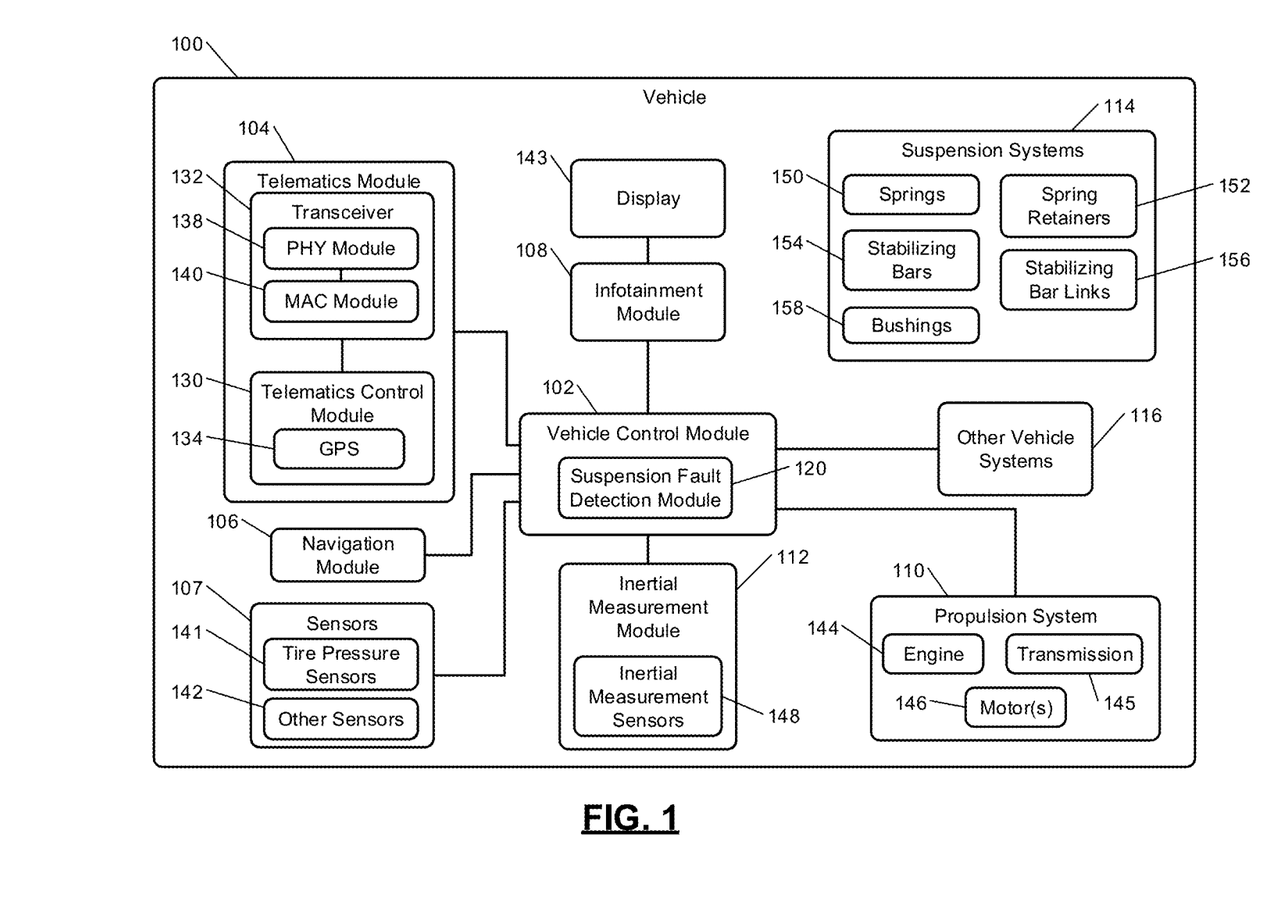
FIG. 1 is a functional block diagram of an example of a vehicle including a suspension fault detection module in accordance with an embodiment of the present disclosure.

FIG. 1 shows a vehicle 100 that includes a vehicle control module 102, a telematics module 104, a navigation module 106, sensors 107, an infotainment module 108, a propulsion system 110 an inertial measurement module 112, suspension systems (front and rear) 114 and other vehicle systems 116. The vehicle control module 102 may control operation of the vehicle 100 and includes a suspension fault detection module 120. The suspension fault detection module 120 performs static suspension tests as further described below to detect and report suspension system faults associated with springs and stabilizer bars of the vehicle 100. The suspension fault detection module 120 may also perform countermeasures based on the detected faults.

The telematics module 104 provides wireless communication services within the vehicle 100 and wirelessly communicates with service providers. The telematics module 104 may support Wi-Fi®, Bluetooth®, Bluetooth Low Energy (BLE), near-field communication (NFC), cellular, legacy (LG) transmission control protocol (TCP), long-term evolution (LTE), and/or other wireless communication and/or operate according to Wi-Fi®, Bluetooth®, BLE, NFC, cellular, and/or other wireless communication protocols. The telematics module 104 may include a telematics control module 130 and a transceiver 132. The telematics control module 130 may include a global positioning system (GPS) 134. The transceiver 132 includes a physical layer (PHY) module 138 and a medium access control (MAC) module 140. The PHY module 138 wirelessly communicates with network devices internal and external to the vehicle 100. The MAC module 140 may perform pattern recognition, channel addressing, channel access control, and filtering operations.

The navigation module 106 executes a navigation application to provide navigation services. The navigation services may include location identification services to identify when the vehicle 100 is in a location at which a suspension test may be performed. The navigation services may also include guiding a driver and/or directing the vehicle 100 to and/or through a predefined test course for testing the suspension systems 114. As an example, if the vehicle 100 is an autonomous vehicle, the navigation module 106 may direct the vehicle control module 102 to the test course. The sensors 107 may include tire pressure sensors 141 and other vehicle sensors 142.

The infotainment module 108 may include and/or be connected to an audio system and/or a video system including one or more displays (one display 143 is shown) to provide vehicle status information, diagnostic information, prognostic information, entertainment features, etc. As an example, the infotainment module 108 may indicate diagnostic and/or prognostic result information associated with performing suspension tests. The infotainment module 108 may be used to guide a vehicle operator to a certain location to perform a suspension test, to remain in a certain location for a predetermined period of time to perform the suspension test, indicate results of the suspension test, indicate to the vehicle operator whether a countermeasure is being performed as a result of the test and what the countermeasure is that is being performed, and/or indicate other related information.

The propulsion system 110 may include an internal combustion engine 144, a transmission 145, and/or one or more electric motors 146 to propel the vehicle 100. The vehicle control module 102 may control the propulsion system 110 to cause the vehicle 100 to move to a location for a suspension test to be performed. The vehicle control module 102 may as a countermeasure limit speed of a vehicle 100, prevent operation of the vehicle 100, and/or cause the vehicle 100 to move to a repair facility if a fault and/or failure of the suspension systems 114 is detected. Other countermeasures are described below.

The inertial measurement module 112 includes inertial measurement sensors 148, such as accelerometers and/or rate sensors. The inertial measurement module 112, as an example, may be located at or near a center of gravity (cg) point of a vehicle. The inertial measurement sensors 148 may be used to measure longitudinal and lateral accelerations and/or pitch and roll rates of the vehicle 100 during static tests (i.e. when the vehicle 100 is standing still). The longitudinal and lateral accelerations and the pitch and roll rates may be integrated to determine pitch angles and roll angles of the vehicle 100. Equations 1-2 are examples for determining pitch angle and roll angle from pitch rate and roll rate.

$$Pa(T)=Pa(0)+\int_{t=0}^{T}Pr(t)dt \qquad (1)$$

$$Ra(T)=Ra(0)+\int_{t=0}^{T}Rr(t)dt \qquad (2)$$

Equation 1 states that the pitch angle (Pa) at time T is equal to a sum of Pa at time 0 and the integration of pitch rate (Pr) over time t. Equation 2 states that the roll angle (Ra) at time T is equal to a sum of Ra at time 0 and the integration of roll rate (Rr) over time t.

Figure 2A:
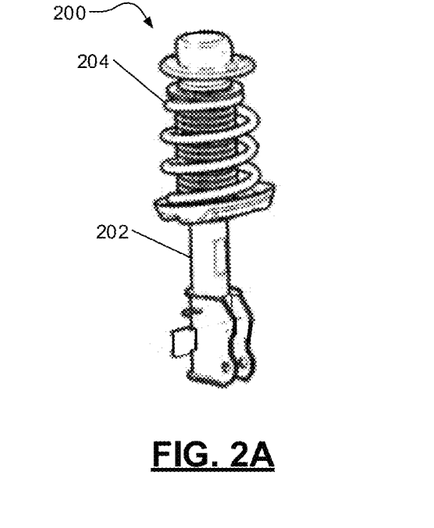
FIG. 2A is a perspective view of an example of a spring over shock assembly.
Figure 2B:
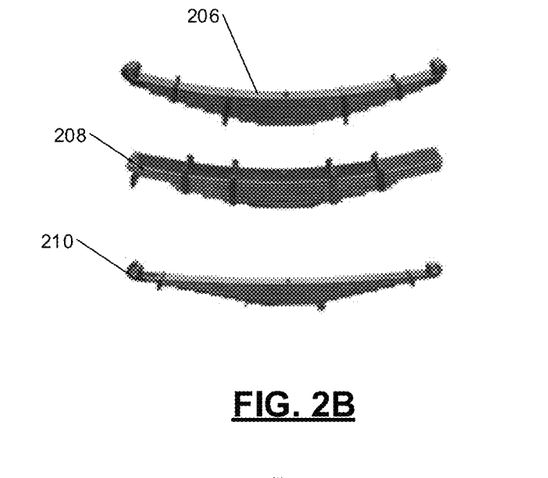
FIG. 2B is a perspective view of a few different leaf springs.
Figure 2C:
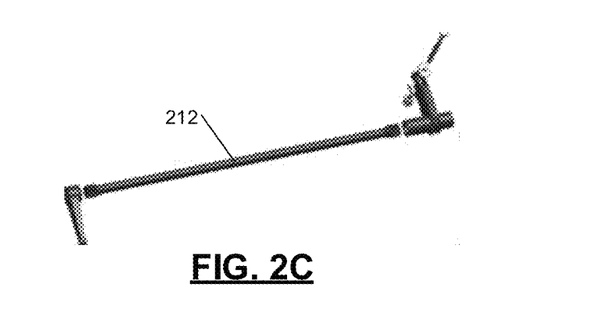
FIG. 2C is a perspective view of a torsion bar.
Figure 2D:
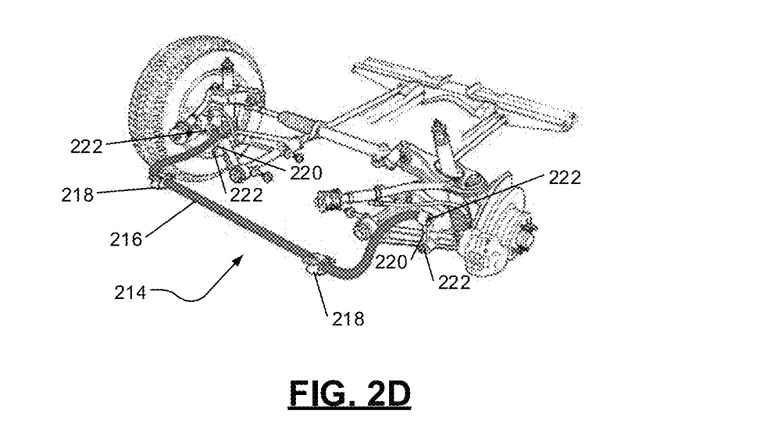
FIG. 2D is a perspective view of an example suspension system including a stabilizing bar and corresponding links and bushings.

The suspension systems 114 may include, for example, springs 150 (e.g., coil springs, leaf springs, torsion bar, or other type of spring), spring retainers 152, stabilizing bars 154, stabilizing bar links 156, bushings 158, and/or other corresponding suspension system components. The bushings 158 may include bushings connecting a stabilizer bar to stabilizer bar links, bushings connecting stabilizer bar links to an A-arm or other vehicle component, and/or bushings connecting a stabilizer bar to other suspension system components. FIG. 2A shows an example of a spring over shock assembly 200 that includes a shock absorber 202 and a spring 204. FIG. 2B shows examples of different leaf springs 206, 208, 210. Leaf springs are often used as part of a rear suspension system. FIG. 2C is a perspective view of a torsion bar 212. FIG. 2D is a perspective view of an example suspension system 214 including a stabilizing bar 216, stabilizing bar mounts 218, and corresponding stabilizing bar links 220 and bushings 222.

Figure 3:
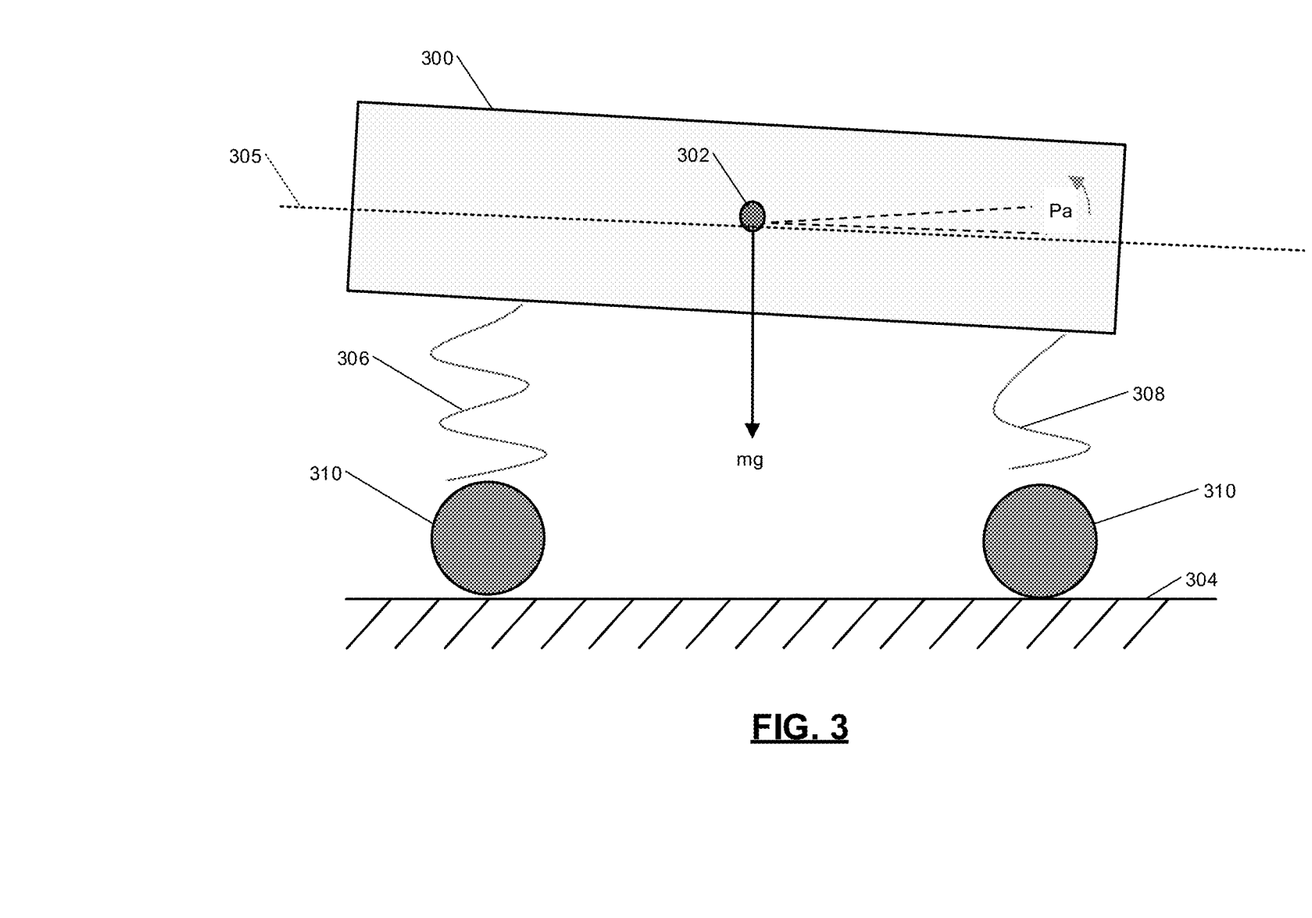
FIG. 3 is a simplified side view of a vehicle illustrating a change in pitch angle due to a spring fault.

FIG. 3 is a simplified side view of a vehicle 300 illustrating a change in pitch angle Pa due to a spring fault. The pitch angle Pa is shown relative to a center of gravity point 302 and a road 304 and a longitudinal axis 305. The vehicle 300 is shown having springs 306, 308 and wheels 310. The spring 308 has a fault and/or is broken. The vehicle weight is represented by mg, where m is mass and g is acceleration of gravity (or 9.8 meters per second squared ($m/s^2$)).

The vehicle 300 may be configured similarly as the vehicle 100 of FIG. 1 and include an inertial measurement module. If the spring 308 is broken, then the height of the vehicle 300 in the location of the spring 308 is reduced. For example, if the spring 308 is located in the right front corner of the vehicle 300, then the height of the right front corner of the vehicle 300 is reduced. This results in a change in a pitch angle and a roll angle of the vehicle 300. Based on vehicle physics and as represented by equations 3-4, the longitudinal acceleration Ax and the lateral acceleration Ay may be measured and used to determine whether the vehicle 300 has a broken spring and/or an associated fault.

$$Ax=g\sin(Pa) \qquad (3)$$

$$Ay=g\sin(Ra) \qquad (4)$$

The vehicle 300 may include four springs; a front left spring, a front right spring, a rear left spring and a right rear spring. When one of the front springs is broken and/or has an associated fault, the longitudinal acceleration Ax is negative. When one of the rear springs is broken and/or has an associated fault, longitudinal acceleration Ax is positive. When one of the left springs is broken and/or has an associated fault, the longitudinal acceleration Ay is negative. When one of the right springs is broken and/or has an associated fault, the lateral acceleration Ay is positive.

As a result, a spring fault can be isolated (meaning the location of the spring in the vehicle can be determined) based on the longitudinal and lateral acceleration Ax and Ay. A front spring fault causes Ax to decrease. A rear spring fault causes Ax to increase. A left spring fault causes Ay to decrease. A right spring fault causes Ax to increase.

Figure 4:
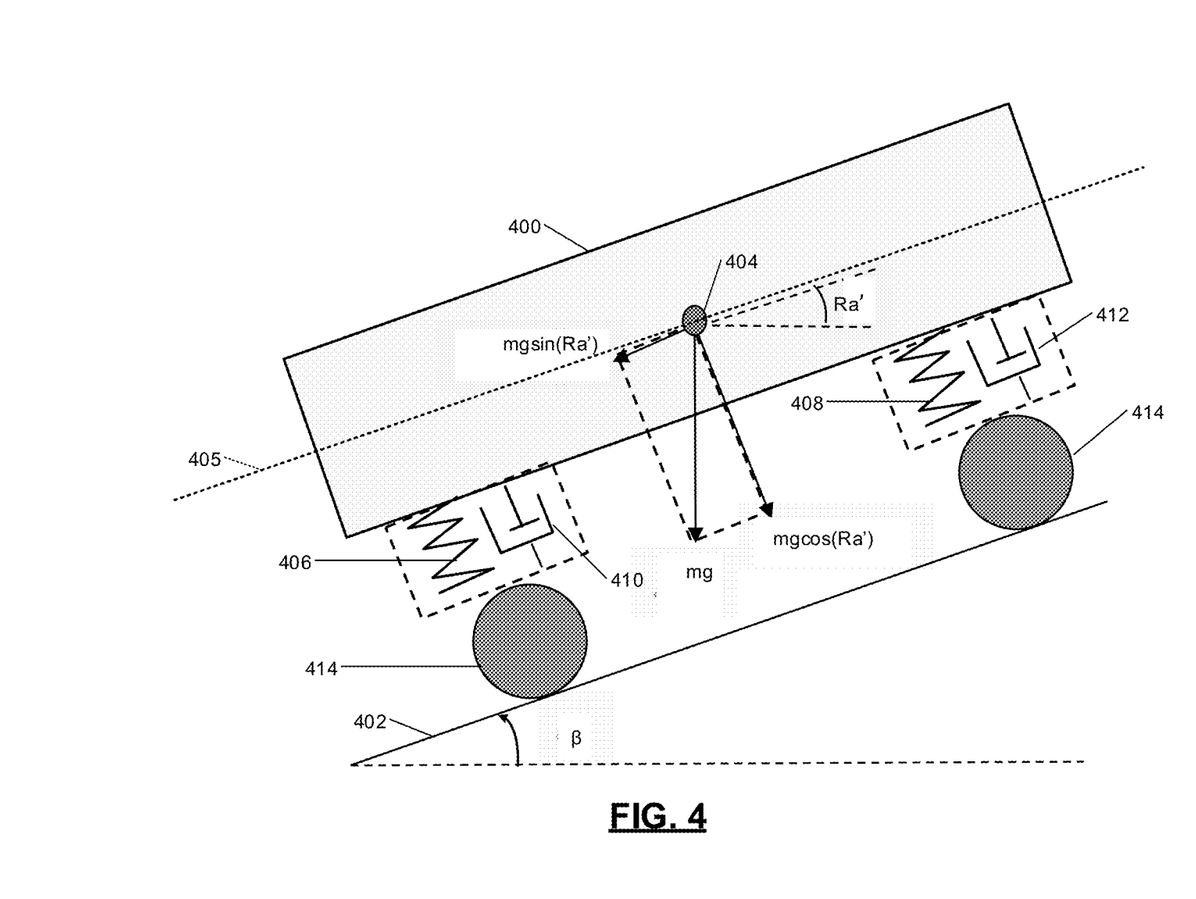
FIG. 4 is a simplified front view of a vehicle illustrating a bank angle of a road and a roll angle relative to the road.

FIG. 4 is a simplified front view of a vehicle 400 illustrating a bank angle β of a road 402 and a roll angle Ra' relative to the road 402. The roll angle Ra' is shown relative to a center of gravity point 404 and the road 402 and a lateral axis 405. The vehicle 400 is shown having left and right springs 406, 408, left and right shock absorbers 410, 412 and wheels 414. Vertical acceleration is represented by mg having corresponding sine and cosine components mg sin (Ra') and mg cos(Ra') relative to the road 402. The actual roll angle Ra of the vehicle relative to a level surface is based on the roll angle Ra' relative to the road 402 and the bank angle β. Both the roll angle Ra' relative to the road 402 and the roll angle Ra are affected by each of the bank angle β and a spring fault.

The force of each of the springs 406, 408 may be represented by equation 5, where F is force, K is spring stiffness, and x is displacement of the spring.

$$F = Kx \tag{5}$$

The larger the force, the more deformation of a spring. When the vehicle 400 is, for example, parked on a banked road, weight of the vehicle 400 is transferred, such that more force is on springs on a first (or lower side) of the vehicle 400 and less force is on springs on a second (or higher side) of the vehicle 400. This is similar to when the vehicle 400 is parked on a ramp, where springs in either the front of the vehicle 400 or in the rear of the vehicle 400 are experiencing more force and the other springs are experiencing less force. On an uphill ramp, the rear springs experience more force. On a downhill ramp, the front springs experience more force.

Accordingly, examples disclosed herein including testing suspension systems of vehicles while the vehicles are parked on banked, inclined and declined road surfaces. Other examples are also provided for when the vehicles are parked and one or more wheels are in a pot hole or recessed area relative to the other wheels of the vehicles. In yet other example, the suspension systems of a vehicle is tested while the vehicle is on, for example, a 4-post test stand, where one or more of the wheels of the vehicle are able to be raised or lowered relative to the vertical elevation level of the other wheels of the vehicle.

As an example, to test rear springs of a vehicle, the vehicle may be parked on an uphill ramp. More deformation is observed in the rear springs, such that the pitch angle Pa and the longitudinal acceleration Ax are positive. On a downhill ramp, more deformation is experienced in front springs and the pitch angle Pa and the longitudinal acceleration Ax are negative.

Since a stabilizing bar impacts lateral stiffness of a vehicle, a stabilizing bar may be tested by parking a vehicle on a banked road surface or the like. A disconnected (or broken) stabilizing bar will reduce lateral stiffness of the vehicle. As a result, more roll angle and lateral accelerations are experienced. By raising a left side of a vehicle and performing a first suspension system test and then lowering the left side of the vehicle, such that the right side of the vehicle is higher than the left side of the vehicle and performing a second suspension system test, a suspension fault detection module can determine whether there is a left side or right side faulty spring and/or a faulty stabilizer bar. As an example, when the stabilizing bar is disconnected or broken and the vehicle is on a banked surface, an absolute value of the lateral acceleration is increased compared to when the stabilizing bar is connected and not broken. As another example, when a right spring is broken, the longitudinal acceleration is increased as compared to a non-faulty spring condition.

A ramp with a larger grade can effectively amplify the longitudinal acceleration difference between a no fault (or healthy) condition and a faulty condition. This also holds true for a larger bank angle, which can effectively amplify the lateral acceleration difference between a no-fault condition and a faulty condition. A longitudinal acceleration difference between a no-fault condition and a faulty condition for a vehicle on a 30% inclined road surface can be approximately 200% more than a longitudinal acceleration difference between a no-fault condition and a faulty condition for a level road surface, where bank angle is 0 and incline/decline angles are 0.

When a front spring is faulty and/or broken, the longitudinal acceleration Ax is decreased compared to a non-faulty condition, where each spring is in a non-faulty state. When a rear spring is faulty and/or broken, the longitudinal acceleration Ax is increased compared to a non-faulty condition.

Figure 5:
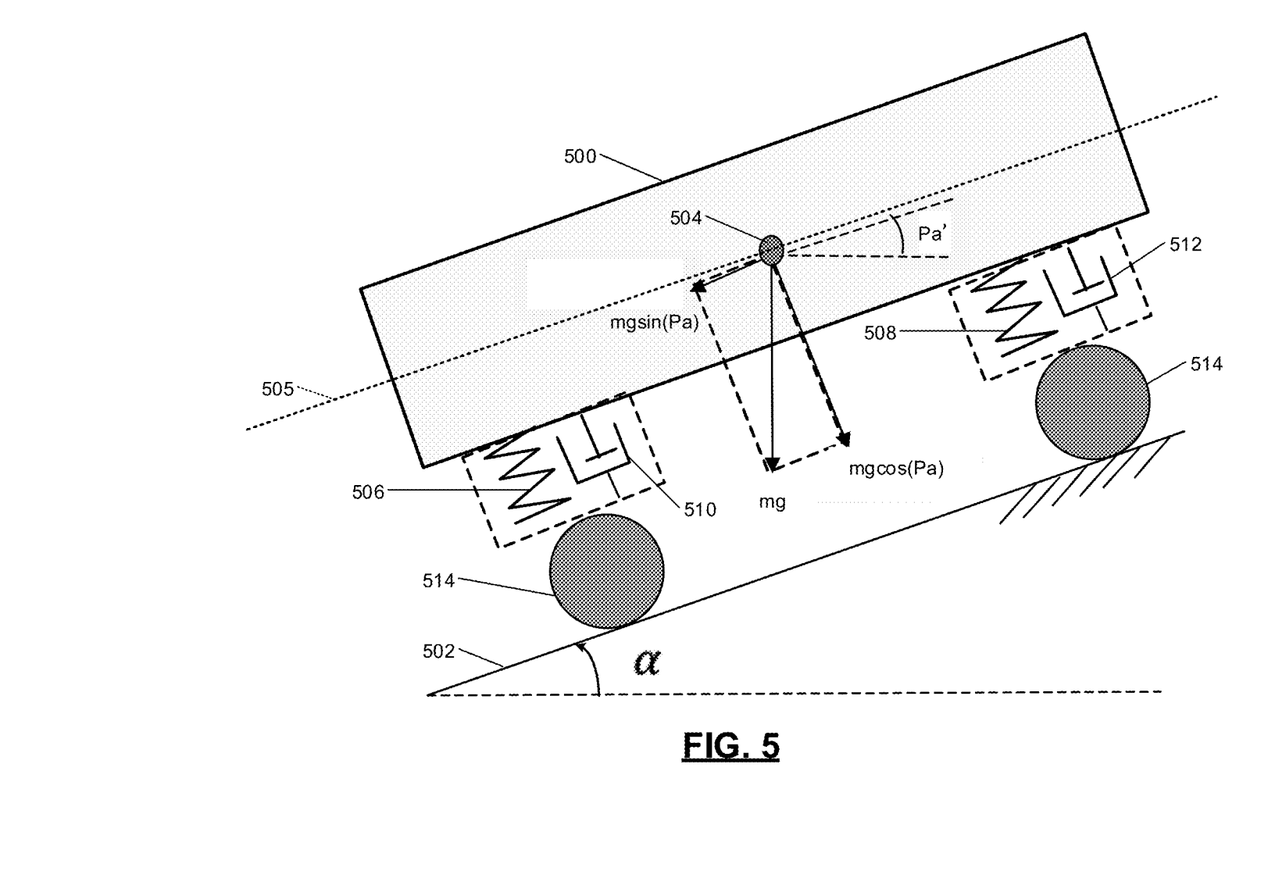
FIG. 5 is a simplified side view of a vehicle illustrating an incline angle of a road and a pitch angle relative to the road.

FIG. 5 is a simplified side view of a vehicle 500 illustrating an incline angle of a road 502 and a pitch angle Pa' relative to the road 502. The pitch angle Pa' is shown relative to a center of gravity point 504 and the road 502 and a lateral axis 505. The vehicle 500 is shown having front and rear springs 506, 508, front and rear shock absorbers 510, 512 and wheels 514. The vehicle weight is represented by mg having corresponding sine and cosine components mg sin (Pa') and mg cos(Pa') relative to the road 502. The actual pitch angle Pa of the vehicle 500 relative to a level surface is based on the pitch angle Pa' relative to the road 502 and the incline angle α. Both the pitch angle Pa' relative to the road 502 and the pitch angle Pa are affected by each of the incline angle α and a spring fault.

The pitch angle Pa' and roll angle Ra' of a vehicle is affected by change in mass of a vehicle. As an example, longitudinal acceleration Ax is equal to a longitudinal component of gravity acceleration when a vehicle is stopped, as represented by equation 6.

$$Ax = g\sin(Pa' + \alpha) \tag{6}$$

From a spring perspective, the spring generates a force to balance a longitudinal component of gravity, represented by equation 7, where Kp is vehicle pitch stiffness. Equation 7 may be rearranged to provide equation 8.

$$mg\sin(Pa' + \alpha) = Kp \cdot Pa' \tag{7}$$

$$\frac{Pa'}{\sin(Pa' + \alpha)} = \frac{mg}{Kp} \tag{8}$$

As an example, if the pitch angle Pa' is 0° or small and the incline angle α is 30° or large, then sin (Pa'+α) is equal to or approximately equal to sin(α). As a result, equation 8 may be simplified to equation 9.

$$Pa' = \frac{mg\sin(\alpha)}{Kp} \tag{9}$$

When the mass m increases, mg/Kp increases, pitch angle Pa' increases, and eventually longitudinal acceleration Ax increases. When a diagnostic and prognostic algorithm is executed to test a suspension system, the mass should either remain the same or be compensated for when determining whether there is a fault. When compensating for mass, a look-up-table (LUT) of change in mass relative to change in Ax or Ay may be used, where change in mass is related to change in Ax or Ay. Based on this relationship, the suspension fault detection module 120 of FIG. 1, while executing the algorithm, is able to determine what portion of Ax and/or Ay is due to a change in mass and what portion is due to a faulty condition.

Based on equations 6-7, since the incline angle α is much larger than the pitch angle Pa, Pa is approximately equal to mg sin(α)/Kp. A change in pitch angle ΔPa may be represented by equation 10.

$$\Delta Pa = Pah - PaF = mg\ \sin(\alpha)\left(\frac{1}{Kph} - \frac{1}{KpF}\right) \quad (10)$$

The larger the change in the road incline angle α, the larger the change in the pitch angle Pa. Using the first degree Taylor Polynomial and equation 6 when the pitch angle is 0, Ax can be represented by equation 11.

$$Ax \approx g\ \sin(\alpha) + g\ \cos(\alpha)Pa \quad (11)$$

$$\Delta Ax \approx g\ \sin(\alpha) + g\ \cos(\alpha)\Delta Pa \quad (12)$$

Equation 12 can be derived from claim 11. Equation 13 can be derived from equations 10 and 12.

$$\Delta Ax = g\sin(\alpha) + mg^2\cos(\alpha)\ \text{sine}\ (\alpha)\left(\frac{1}{Kph} - \frac{1}{KpF}\right) \quad (13)$$

A larger change in pitch angle Pa results in a larger change in longitudinal acceleration Ax.

Figure 6:
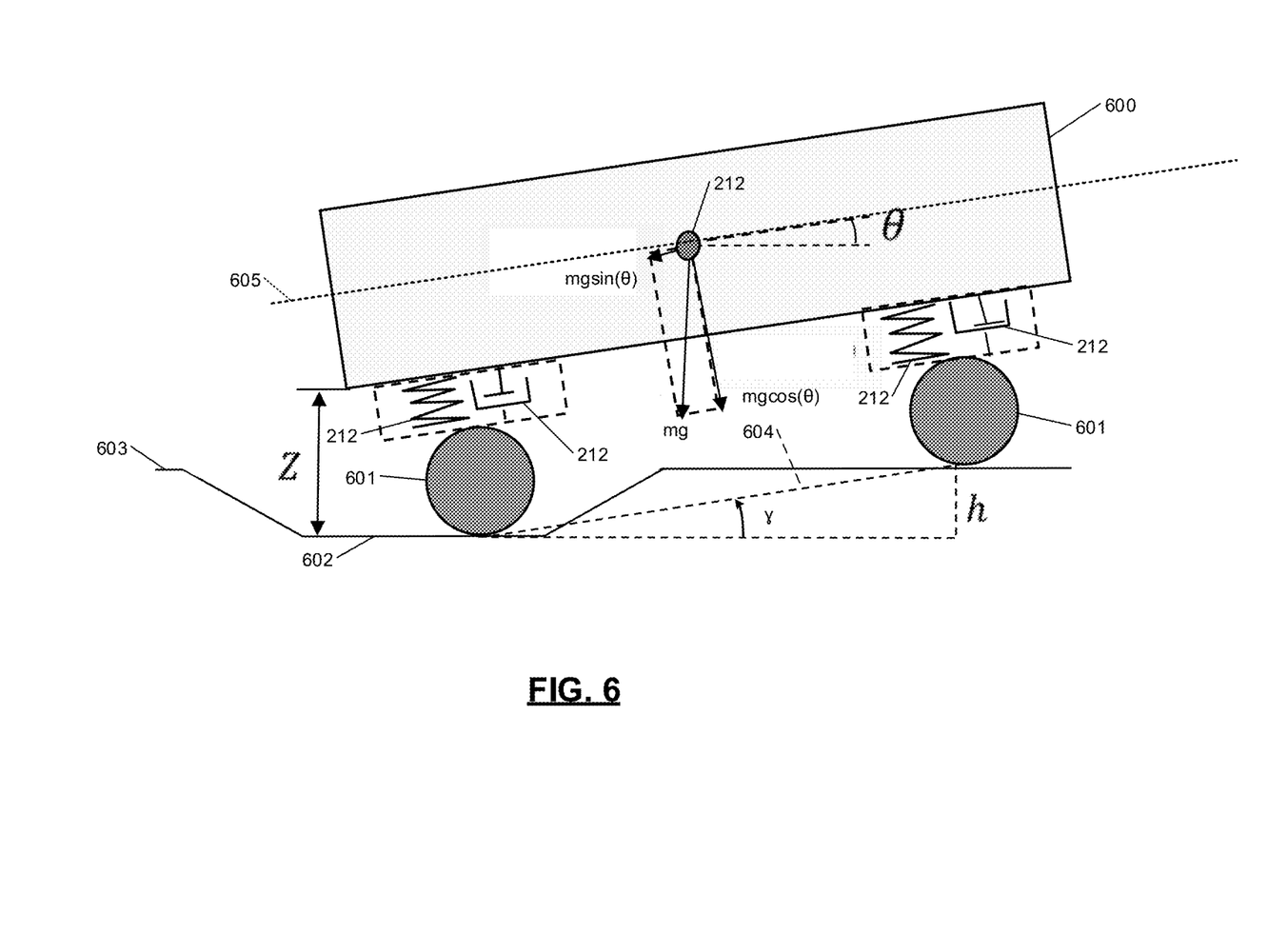
FIG. 6 is a simplified side view of a vehicle illustrating an angle between wheels due to a pothole or recessed area and a pitch or roll angle relative to a tangential plane contacting bottom surfaces of the wheels.

FIG. 6 is a simplified side view of a vehicle 600 illustrating an angle γ between wheels 601 due to a pothole (or recessed area) 602 of a road 603 and an angle θ, which may be a pitch angle or a roll angle, relative to a tangential plane 604 contacting bottom surfaces of wheels 601. The angle θ may be a pitch angle when a front or a rear wheel of the vehicle 600 is in the pothole 602. The angle θ may be a roll angle when a left wheel or a right wheel of the vehicle 600 is in the pothole 602. A difference between heights of the wheels 601 is identified as h.

Figure 7:
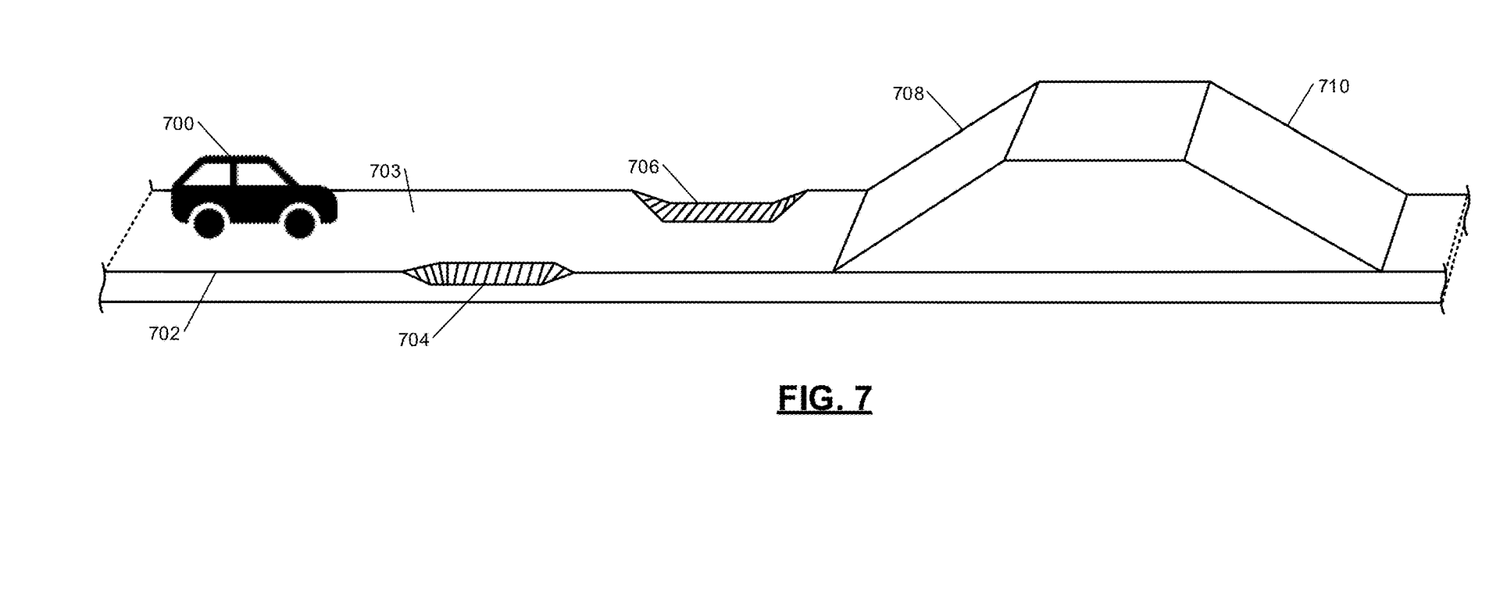
FIG. 7 is an example predefined test course having five areas for affecting a suspension of a vehicle differently during a test of suspension systems of a vehicle in accordance with the present disclosure.

FIG. 7 is an example predefined test course having five areas for affecting a suspension of a vehicle differently during a test of suspension systems of the vehicle. In the example shown, a vehicle 700 moves (either driven or autonomously) to each of the different areas (or stations). A test is performed at each of the stations. The vehicle 700 is parked in each of the stations during each of the tests, which are referred to as static tests because the vehicle 700 is not moving during the tests. At the first station, designated 702, the vehicle 700 is on a level surface 703 where all of the wheels of the vehicle are at a same elevation level and longitudinal and lateral acceleration, pitch and roll rates, and/or pitch and roll angles are determined. The data may then be stored in memory, such as memory of the vehicle control module 102 of FIG. 1. The vehicle 700 is then moved to a next station, designated 704, where the right side wheels are in a lower recessed area and the vehicle is on a bank angle. A recessed area may be a pothole and/or other type of recessed portion of a road. The vehicle 700 is then moved to a next station, designated 706, where the left wheels of the vehicle are in a recessed area and are at an elevation lower than the right wheels. The vehicle 700 is again on a bank angle. As an alternative to stations 704 and 706, other stations with raised surfaces may be implemented where the right wheels and the left wheels are elevated rather than lowered relative to the level surface 703. The vehicle 700 is then moved to a next station, such as the inclined ramp 708. The vehicle is then moved to the next station, such as the declined ramp 710. Longitudinal and lateral acceleration, pitch and roll rates, and pitch and roll angles are determined for each static test at each station and are stored in memory.

Figure 8:
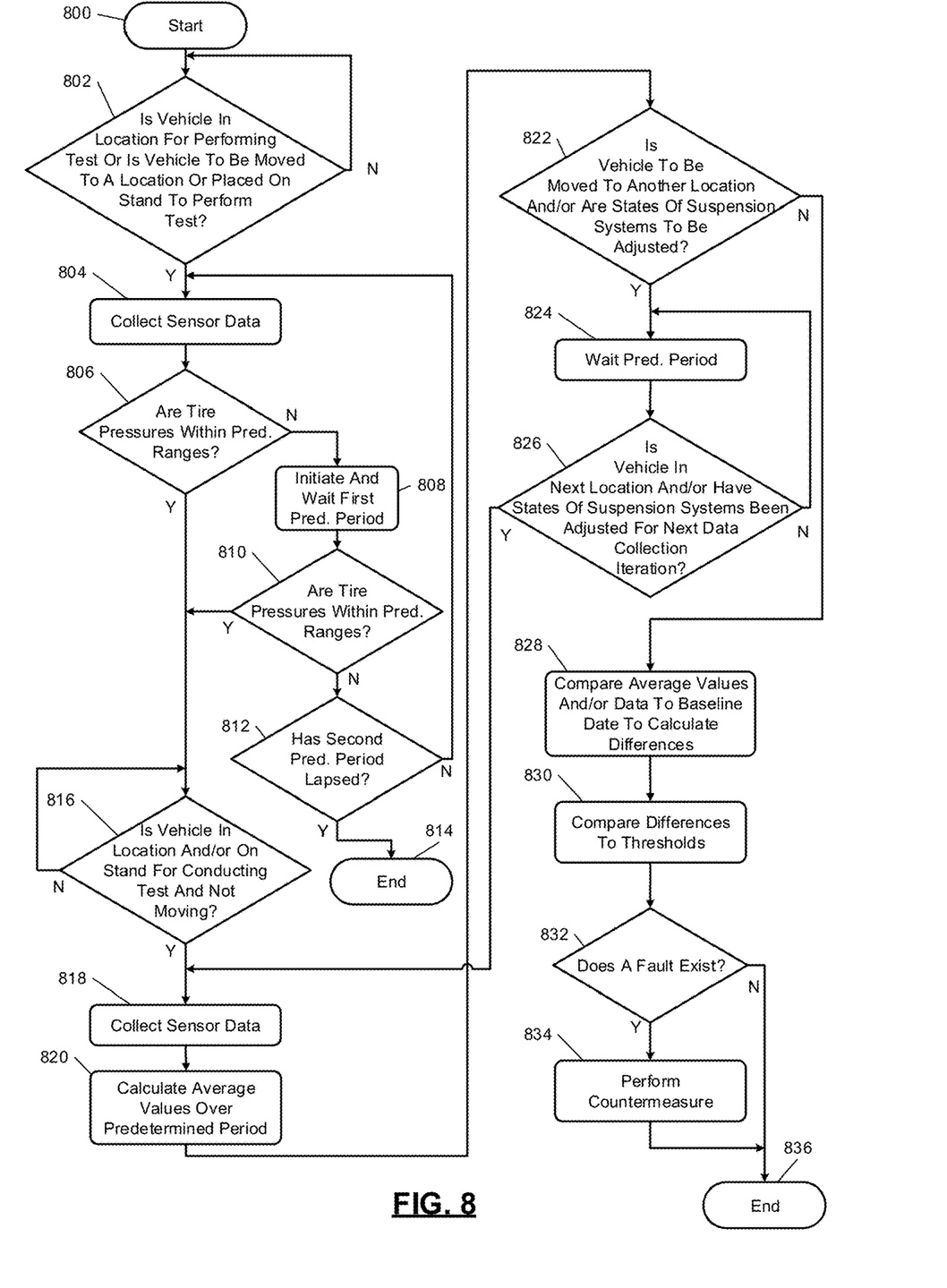
FIG. 8 is an example suspension testing method in accordance with the present disclosure.

In FIG. 8, a suspension testing method is shown. Although the following operations are primarily described with respect to the implementations of FIGS. 1 and 3-7, the operations may be easily modified to apply to other implementations of the present disclosure. The operations may be performed by the suspension fault detection module 120 and/or be iteratively performed.

The method may begin at 800. At 802, the suspension fault detection module 120 determines whether the vehicle 100 is in a location for performing a suspension system test or is to be moved to a location or placed on a stand to perform a suspension system test. The stand may be a 4-post test stand having four pads on which wheels of the vehicle are placed. The location may be a location of a predesigned course as shown in FIG. 7 or may be a geographical location know to have certain elevation, bank angle, incline angle, decline angle, and/or other suspension system testing characteristics. The suspension fault detection module 120, based on a GPS signal, received from the telematics control module 130 may initiate a test based on a location of the vehicle. In one embodiment, the vehicle control module 102 and/or the suspension fault detection module 120 guides and/or causes the vehicle 100 to drive to a location to have a test performed. This may be done periodically to check the suspension systems of the vehicle 100. If the vehicle is in a location or is to be moved to a location for a test, operation 804 is performed.

At 804, the suspension fault detection module 120 may collect, sensor data including tire pressure sensor data from the tire pressure sensors 141. At 806, the suspension fault detection module 120 determines whether the tire pressure of each of the tires of the vehicle is within a corresponding predetermined pressure range and/or a predetermined range of a corresponding baseline pressure. The baseline pressure may be an initial pressure, a default pressure, a predetermined pressure, etc. If the tire pressures are within one or more predetermined range(s) (e.g., a different pressure range may be used for front tires than for rear tires), then operation 816 is performed, otherwise operation 808 may be performed.

At 808, the suspension fault detection module 120 waits a first predetermined period to allow for the pressures of one or more of the tires to be adjusted. The suspension fault detection module 120 may generate a signal indicating that one or more of the tire pressures are outside corresponding predetermined ranges. This may include, for example, displaying a signal via the display 143 indicating to adjust tire pressures, generating an audio signal indicating to adjust tire pressures, driving the vehicle to a tire pressure station, etc.

At 810, the suspension fault detection module 120 determines whether the tire pressures are within the one or more predetermined ranges. If yes, then operation 816 is performed, otherwise operation 812 is performed. At 812, the suspension fault detection module 120 determines whether a second predetermined period has lapsed. The second predetermined period begins when operation 808 is performed a first time for a current iteration of the method of FIG. 8. The second predetermined period is longer than the first predetermined period. If the second predetermined period has lapsed, then the method may end at 814 as shown or return to operation 802. If the second predetermined period has not lapsed, then operation 808 may be performed.

At 816, the suspension fault detection module 120 determines if the vehicle 100 is in a location and/or on a test stand for conducting a suspension system test and is not moving (e.g., parked). If yes, operation 818 is performed.

At 818, the suspension fault detection module 120 collects sensor data. This may include collecting data from the inertial sensors 148 and/or other related data from the inertial measurement module 112 while the vehicle 100 is in a certain location and/or while the vehicle 100 and suspension systems are in certain states. The static uses gravity instead of longitudinal and lateral acceleration or deceleration to excite the suspension systems.

At 820, the suspension fault detection module 120 may calculate average values of parameters for a predetermined period of time (e.g., 10 seconds(s)), such as average longitudinal and lateral acceleration values, average pitch and roll rates, average pitch angles, and average roll angles. The average values may be stored in memory.

At 822, the suspension fault detection module 120 determines whether the vehicle is to be moved to another test location and/or are the states of the suspension systems of the vehicle 100 to be changed for another test. This may include lifting one or more wheels of the vehicle and/or lowering one or more wheels of the vehicle. In one embodiment, this includes lifting two or more wheels of the vehicle and/or lowering two or more wheels of the vehicle. As an example, the vehicle may be moved from one of the stations of FIG. 7 to a next one of the stations of FIG. 7. If the vehicle is to be moved and/or the states of the suspension systems of the vehicle 100 are to be adjusted, then operation 824 is performed, otherwise operation 828 is performed.

At 824, the suspension fault detection module 120 may wait a predetermined period before performing operation 826. At 826, the suspension fault detection module 120 determines whether the vehicle 100 is in a next location and/or the states of the suspension systems have been adjusted for a next sensor data collection iteration. If yes, then operation 818 is performed, otherwise operation 824 may be performed.

At 828, the suspension fault detection module 120 compares the average values to baseline and/or predetermined default values to calculate differences, such as ΔAy and ΔAx, where (i) ΔAy is a difference between the average value of Ay and the corresponding baseline value of Ay, and (ii) ΔAx is a difference between the average value of Ax and the corresponding baseline value of Ax. The baseline value may refer to values of Ay and Ax measured when the vehicle 100 is on a level surface and does not have a suspension system fault. The baseline values may be average values for a fleet of vehicles of the same type, initial values when the vehicle 100 is new and/or has less than a predetermined number of miles, and/or other predefined values.

At 830, the suspension fault detection module 120 compares the differences to predetermined threshold values. As an example, the differences may be compared to thresholds T2, T3, T4, T5, T6, T7 and may be used to isolate and identify a fault based on the differences. For example, if a difference in Ay is greater than T2, a difference in Ax is greater than T2, a difference in Ax is greater than T5 and a difference in Ay is greater than T5, then a front left spring is broken.

In Table 1, >T2 and >T5 mean a difference is positive, <T3 and <T4 mean a difference is negative, and <T6 and >T7 mean a difference is approximately equal to 0. As an example, T2 may be equal to 0.03, T3 may be equal to –0.05, T4 may be equal to –0.05, T5 may be equal to 0.03, T6 may be equal to 0.02 and T7 may be equal to –0.02. The thresholds T2-T7 may have different values than stated above. Two or more of the thresholds T2-T7 may have a same value. The threshold values T2-T7 depend on the grade (or slope) of a road and/or the bank angle of the road.

TABLE 1

| Failure Mode | Left Side Up ΔAy | Right Side Up ΔAx | Inclined Ramp ΔAx | Declined Ramp ΔAy |
|---|---|---|---|---|
| Front Left Broken Spring | >T2 | >T2 | >T5 | >T5 |
| Front Right Broken Spring | <T3 | <T3 | >T5 | >T5 |
| Rear Left Broken Spring | >T2 | >T2 | <T4 | <T4 |
| Rear Right Broken Spring | <T3 | <T3 | <T4 | <T4 |
| Disconnected or Broken Stabilizer Bar | >T2 | <T3 | <T6 & >T7 | <T6 & >T7 |

As a simplified alternative to utilizing all of Table 1, a portion of Table 1 may be utilized. In one embodiment and for each of the rows, a threshold from one of the second and third columns and a threshold from one of the third and fourth columns are used. As an example, see Table 2, which is a simplified version of Table 1.

TABLE 2

| Failure Mode | Left Side Up ΔAy | Inclined Ramp ΔAx |
|---|---|---|
| Front Left Broken Spring | >T2 | >T5 |
| Front Right Broken Spring | <T3 | >T5 |
| Rear Left Broken Spring | >T2 | <T4 |
| Rear Right Broken Spring | <T3 | <T4 |
| Disconnected or Broken Stabilizer Bar | >T2 | <T6 & >T7 |

A fault may be isolated and identified using Table 1, Table 2 or another similar table. Although Tables 1 and 2 include longitudinal and lateral acceleration thresholds, other tables may be utilized. In one embodiment, pitch and roll rates are compared to corresponding thresholds, instead of longitudinal and lateral accelerations. In another embodiment, pitch and roll angles are used instead of longitudinal and lateral accelerations. The tables are used to isolate and identify the faults.

At 832, the suspension fault detection module 120 determines whether a fault exists based on the comparisons between the differences and the thresholds. This may include isolating the fault to a certain location on the vehicle, such as left front, right front, left rear, right rear, or stabilizing bar. This may also include identifying the fault, broken spring, broken or disconnected stabilizer bar, worn out spring, worn out bushing, etc. This may also include a prognostic report indicating predicted life remaining of certain components, and/or a predicted number of miles and/or time until a failure is to occur and identification of the predicted failure. If a fault exists, operation 834 may be performed, otherwise the method may end at 836.

At 834, the suspension fault detection module 120 performs a countermeasure. For example, the suspension fault detection module 120 may generate a report signal and/or an alert signal, which may be displayed on the display 143 indicating the fault. The suspension fault detection module 120 may transmit a signal via the telematics module 104 to a central monitoring station indicating the detected fault. The detected faults may be reported to a fleet manager. As another example, the suspension fault detection module 120 may limit the speed of the vehicle 100 to below a predetermined speed. The suspension fault detection module 120 may limit traveling distance and/or prevent the vehicle 100 from traveling on certain roads and/or in certain locations. As another example, the suspension fault detection module 120 may guide and or autonomously drive the vehicle to a repair center. As another example, the suspension fault detection module 120 may prevent the vehicle from being driven until repaired and one or more fault flags are reset. The method may end subsequent to performing operation 834.

During the above-described method, the weight of the vehicle 100 may be determined and compensated for as described above. For example, operations 818, 820, 828, 830 may be modified and/or other operations may be added to include determining weight of the vehicle 100 and compensating for the weight and/or changes in weight. A baseline weight value may be stored and compared to the determined weight. As an example, the vehicle may be placed on a scale to determine the weight. This may occur prior to moving the vehicle to the first station of the course shown in FIG. 7. A network device at a weigh station where the vehicle 100 is being weighed may signal the suspension fault detection module 120 the weight of the vehicle. If the weight of the vehicle has changed, a different set of threshold values may be used, which may be determined based on the change in weight. In one embodiment, the suspension fault detection module 120 refrains from performing a test on the suspension system of the vehicle 100 when the difference between the weight of the vehicle and the baseline weight is greater than a predetermined threshold.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above-described examples utilize static road tests to evaluate suspension system components including springs and stabilizing bars and associated components. This allows for detection and isolation of corresponding faults. This increases vehicle uptime and availability. The examples are applicable to non-autonomous vehicles, partial autonomous vehicles with driver assistance, and fully autonomous vehicles. The tests include spring and stabilizing bar diagnostics and prognostics. LUTs are utilized for fast, robust and accurate determinations.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for testing a suspension system of a vehicle, the system comprising:
   an inertial measurement module configured to, while the vehicle is not moving and is at a testing site for static testing the suspension system, collect sensor data from one or more inertial measurement sensors for a plurality of different preselected static states of the suspension system, wherein the sensor data is indicative of inertial states of the vehicle while the suspension system is in each of the plurality of different preselected static states; and
   a suspension fault detection module configured to
      during testing of the suspension system and based on the sensor data and a set of thresholds, determine whether a fault exists with the suspension system and isolate and identify the fault, and
      perform a countermeasure based on detection of the fault.

2. The system of claim 1, further comprising the one or more inertial measurement sensors configured to generate one or more sensor signals, wherein the one or more sensor signals include the sensor data.

3. The system of claim 1, wherein the sensor data includes longitudinal acceleration data, lateral acceleration data, pitch rate data and roll rate data.

4. The system of claim 1, wherein the suspension fault detection module is configured to:
   integrate the sensor data to determine a pitch angle and a roll angle of the vehicle; and
   based on the pitch angle and the roll angle, determine whether there is a fault with the suspension system.

5. The system of claim 1, wherein:
the sensor data includes longitudinal acceleration data and lateral acceleration data; and
the suspension fault detection module is configured to
   determine averages of the longitudinal acceleration data and the lateral acceleration data over a predetermined period of time,
   compare the averages to the set of thresholds, and
   based on results of comparing the averages to the set of thresholds, determine whether there is a fault with the suspension system and isolate and identify the fault.

6. The system of claim 1, wherein:
the sensor data includes pitch rate data and roll rate data; and
the suspension fault detection module is configured to
   determine averages of the pitch rate data and the roll rate data over a predetermined period of time,
   compare the averages to the set of thresholds, and
   based on results of comparing the averages to the set of thresholds, determine whether there is a fault with the suspension system and isolate and identify the fault.

7. The system of claim 1, wherein:
the sensor data includes at least one of longitudinal and lateral acceleration data or pitch and roll rate data; and
the suspension fault detection module is configured to
   determine pitch angles and roll angles based on the at least one of the longitudinal and lateral acceleration data or the pitch and roll rate data,
   determine average pitch angles and average roll angles over a predetermined period of time,
   compare the average pitch angles and the average roll angles to the set of thresholds, and
   based on results of comparing the average pitch angles and the average roll angles to the set of thresholds, determine whether there is a fault with the suspension system and isolate and identify the fault.

8. The system of claim 1, wherein the suspension fault detection module is configured to, based on the sensor data and the set of thresholds, determine whether a fault exists with a particular spring of the suspension system.

9. The system of claim 1, wherein the suspension fault detection module is configured to, based on the sensor data and the set of thresholds, determine whether a fault exists with a stabilizing bar of the suspension system.

10. The system of claim 1, wherein the suspension fault detection module is configured to:
check pressures of tires of the vehicle; and
based on the pressures, enable testing of the suspension system of the vehicle to determine whether a fault exists with the suspension system.

11. The system of claim 1, wherein the suspension fault detection module is configured to:
compare a weight of the vehicle to a baseline weight; and
based on a difference between the weight of the vehicle and the baseline weight, compensate for the difference when determining whether a fault exists with the suspension system.

12. The system of claim 1, wherein:
the testing site includes a plurality of different stations; and
the inertial measurement module is configured to collect the sensor data for the plurality of different preselected static states while the vehicle is at the plurality of different stations respectively causing the suspension system to be in the plurality of different preselected static states.

13. The system of claim 1, wherein:
the testing site includes a 4-post test stand; and
the inertial measurement module is configured to collect the sensor data for the plurality of different preselected static states while the vehicle is on a 4-post test stand, which causes the suspension system to be in the plurality of different preselected static states.

14. A method for testing a suspension system of a vehicle, the method comprising:
while the vehicle is not moving and is at a testing site for static testing the suspension system, collecting sensor data from one or more inertial measurement sensors for a plurality of different preselected static states of the suspension system at a testing site for static testing, wherein the sensor data is indicative of inertial states of the vehicle while the suspension system is in each of the plurality of different preselected static states; and
during testing of the suspension system and based on the sensor data and a set of thresholds, determining whether a fault exists with the suspension system and isolating and identifying the fault; and
performing a countermeasure based on the detection of the fault.

15. The method of claim 14, wherein the sensor data includes longitudinal acceleration data, lateral acceleration data, pitch rate data and roll rate data.

16. The method of claim 14, further comprising:
integrating the sensor data to determine a pitch angle and a roll angle of the vehicle; and
based on the pitch angle and the roll angle, determining whether there is a fault with the suspension system.

17. The method of claim 14, further comprising:
determining averages of longitudinal acceleration data and lateral acceleration data over a predetermined period of time, wherein the sensor data includes the longitudinal acceleration data and the lateral acceleration data;
comparing the averages to the set of thresholds; and
based on results of comparing the averages to the set of thresholds, determining whether there is a fault with the suspension system and isolate and identify the fault.

18. The method of claim 14, further comprising:
determining averages of pitch rate data and roll rate data over a predetermined period of time, wherein the sensor data includes the pitch rate data and the roll rate data;
comparing the averages to the set of thresholds; and
based on results of comparing the averages to the set of thresholds, determining whether there is a fault with the suspension system and isolate and identify the fault.

19. The method of claim 14, further comprising:
determining pitch angles and roll angles based on at least one of longitudinal and lateral acceleration data or pitch and roll rate data, wherein the sensor data includes the at least one of the longitudinal and lateral acceleration data or the pitch and roll rate data;
determining average pitch angles and average roll angles over a predetermined period of time;
comparing the average pitch angles and the average roll angles to the set of thresholds; and
based on results of comparing the average pitch angles and the average roll angles to the set of thresholds, determining whether there is a fault with the suspension system and isolate and identify the fault.

20. The method of claim 14, further comprising:
checking pressures of tires of the vehicle;
based on the pressures, enable testing of the suspension system of the vehicle to determine whether a fault exists with the suspension system;
comparing a weight of the vehicle to a baseline weight; and
based on a difference between the weight of the vehicle and the baseline weight, compensating for the difference when determining whether a fault exists with the suspension system.

* * * * *